Aug. 8, 1933.                F. J. WELSH                1,921,555
                             SEALING RING
                         Filed April 23, 1931

INVENTOR
Frank J. Welsh
BY
Brockett, Hyde, Higley & Meyer
ATTORNEYS

Patented Aug. 8, 1933

1,921,555

UNITED STATES PATENT OFFICE 1,921,555

SEALING RING

Frank J. Welsh, Parma Heights Village, Ohio

Application April 23, 1931. Serial No. 532,182

1 Claim. (Cl. 220—46)

My invention relates to a sealing ring and particularly, to a sealing ring adapted for use in combination with an ice cream container and a refrigerating apparatus wherein the ice cream container fits loosely within a compartment in the refrigerating apparatus to prevent lateral movement of the ice cream container in the refrigerating compartment and to maintain the low temperature in the refrigerating compartment around and about the outer wall of the ice cream container.

In the usual construction, an ice cream container takes the form of a cylindrical can of substantial length which is adapted to fit within a refrigerating compartment including cooling coils through which a refrigerant is passed in order to maintain a low temperature within the refrigerating compartment. Of necessity, the ice cream containers are much smaller in diameter than the refrigerating compartment to fit loosely therein so as to be easily removable therefrom and also to provide a space for air at a low temperature around the outer wall of the container. With this construction, each time the lid of the refrigerating compartment is removed to obtain ice cream from the container, a certain amount of relatively warm atmospheric air enters the space between the ice cream container and the refrigerating compartment wall or, at least, the temperature of the air in such space is raised. This is undesirable in that it reduces the effectiveness of the refrigerating apparatus which makes it difficult to maintain the ice cream in solid condition as is desired. Further, the loose fit of the ice cream container within the refrigerating compartment permits the container to oscillate or wobble each time ice cream is being removed therefrom which makes the removal of the ice cream relatively difficult.

It is the object of my invention to provide a sealing means which will prevent atmospheric air from entering the space between the ice cream container and the refrigerating compartment wall or from having contact with the cold air therein and will also prevent oscillation or wobbling of the ice cream container within the compartment.

Figure 1:
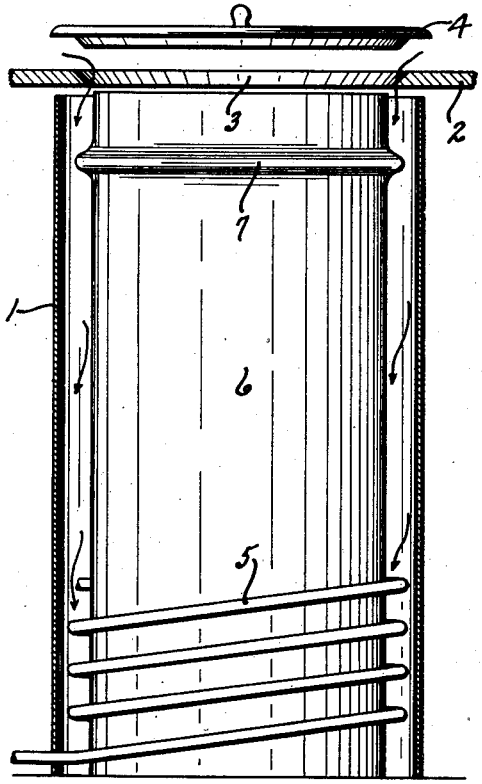
Figure 2:
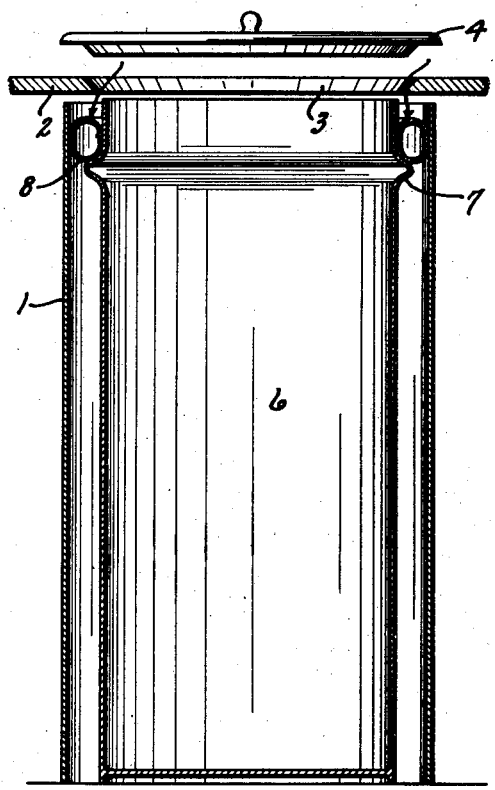
Figure 3:
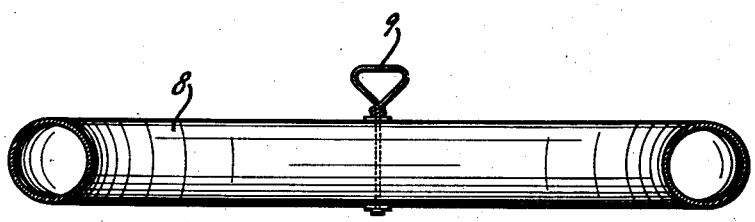

Various other objects and advantageous features of my invention will be seen in the following description and one embodiment thereof will be seen in the accompanying drawing wherein similar characters of reference designate corresponding parts, and wherein:

Fig. 1 is a view, partly in section, showing an ice cream container within a refrigerating compartment; Fig. 2 is a sectional view showing the ice cream container within the refrigerating compartment and showing the sealing which I provide for preventing oscillation or wobbling of the ice cream container or a reduction of temperature in the refrigerating compartment when the cover is lifted therefrom; and Fig. 3 is a view of a part of the sealing ring constructed in accordance with my invention.

Referring to the drawing, I have more or less diagrammatically shown a cooling or refrigerating system such as is employed in retail dispensaries for maintaining ice cream in a solid condition embodying an outer casing 1 and a top or cover 2 having an opening 3 therein for the reception of a cover or lid 4, the casing 1 being provided with a coil pipe 5 that may be of any shape, size or form and through which a refrigerant is adapted to be passed to maintain the temperature within the refrigerating compartment at or around a given point. As shown, an original ice cream container 6 is adapted to fit within the casing 1 and inside of the pipe coil 5, the open ends of the container being disposed immediately beneath the opening in the top or cover 2 that is adapted to be closed by the lid or cover 4.

In accordance with my invention, the container 6 is provided with an annular outwardly projecting flange 7 adjacent the top edge thereof and a sealing ring 8 is provided which is preferably hollow and of annular form and is adapted to be disposed between the outer wall of the container 6 and the inner wall of the casing 1, the ring being compressed as shown in Fig. 2 in being disposed in such position. As shown, in operative position, the sealing ring 8 rests on the outwardly extending annular flange 7. Such sealing ring is preferably provided with a handle 9 by means of which it may be removed from its compressed position between the container and the compartment wall.

In the use of this device, it being understood that it is desirable to maintain the temperature in the refrigerating compartment at a low point and at as even a temperature as possible, the lid or cover 4 is removed from the opening 3 and a container 6 having ice cream therein is disposed within the refrigerating compartment. Then, the sealing ring 8 is pressed into the position shown in Fig. 2 between the outer wall of the container 6 and the inner wall of the casing 1 until it rests upon the outwardly extending annular flange 7 on the container. In pressing the sealing ring to this position, it is compressed as shown in Fig. 2 which will effectively seal the space between the container and the casing against any inrush of atmospheric air or any raising of the temperature in such space by contact of atmospheric air with the air therein. Thus, the space may be maintained at an even temperature which will keep the ice cream in its desired solid condition. Further, such disposition of the ring which effectively prevents any oscillation or wobbling of the ice cream container when ice cream is being removed therefrom. The advantage of such sealing means which also acts as a stabilizing means will be readily apparent.

What I claim is:

In combination with a refrigerating apparatus including a refrigerating means disposed between adjacent walls formed by an outer casing and a container within said casing, means for sealing the space between the outer casing wall and the container wall adjacent the tops thereof comprising a hollow flexible sealing ring that is compressible into a position between the walls of the refrigerating compartment.

FRANK J. WELSH.